United States Patent

(12) United States Patent
Tsutsumi

(10) Patent No.: US 9,373,825 B2
(45) Date of Patent: Jun. 21, 2016

(54) CELL AND METHOD FOR MANUFACTURING CELL

(75) Inventor: Masakazu Tsutsumi, Kyoto (JP)

(73) Assignee: GS YUASA INTERNATIONAL LTD., Kyoto-shi, Kyoto (JP)

( * ) Notice: Subject to any disclaimer, the term of this patent is extended or adjusted under 35 U.S.C. 154(b) by 207 days.

(21) Appl. No.: 13/823,713

(22) PCT Filed: Sep. 27, 2011

(86) PCT No.: PCT/JP2011/072108
§ 371 (c)(1),
(2), (4) Date: Mar. 14, 2013

(87) PCT Pub. No.: WO2012/043578
PCT Pub. Date: Apr. 5, 2012

(65) Prior Publication Data
US 2013/0171510 A1 Jul. 4, 2013

(30) Foreign Application Priority Data
Sep. 30, 2010 (JP) .................... 2010-222622

(51) Int. Cl.
*H01M 2/02* (2006.01)
*H01M 2/04* (2006.01)
*H01M 2/06* (2006.01)
(Continued)

(52) U.S. Cl.
CPC .............. *H01M 2/06* (2013.01); *H01M 2/0426* (2013.01); *H01M 2/0482* (2013.01); *H01M 2/0486* (2013.01); *H01M 2/30* (2013.01); *Y10T 29/49108* (2015.01)

(58) Field of Classification Search
USPC ............... 429/163–187; 29/623.1–623.5
See application file for complete search history.

(56) References Cited

U.S. PATENT DOCUMENTS

2005/0238930 A1* 10/2005 Yoshida et al. ............... 429/7
2007/0026302 A1* 2/2007 Yoon ............................. 429/129
(Continued)

FOREIGN PATENT DOCUMENTS

| JP | 59-042767 A | 3/1984 |
|----|-------------|--------|
| JP | 5-190161 A | 7/1993 |
| JP | 6-41050 | 5/1994 |

(Continued)

OTHER PUBLICATIONS

Machine Translation of Kiyohide et al. (JP 2002-304973, published Oct. 2002, pp. 1-6).*

(Continued)

*Primary Examiner* — Basia Ridley
*Assistant Examiner* — Caitlin Wilmot
(74) *Attorney, Agent, or Firm* — McGinn IP Law Group PLLC

(57) ABSTRACT

Provided are a cell capable of preventing damage to an insulating gasket by spatter scattered when a battery case and a cover plate are laser-welded together, and thereby ensuring sealability of a cell case and a method for manufacturing the cell. A shielding member is arranged between a weld line and at least a portion of the insulating gasket adjacent to the weld line. Since the shielding member blocks the spatter scattered toward the insulating gasket, the insulating gasket is not damaged by the spatter. The insulating gasket is not damaged, so that adhesion between the insulating gasket and the cover plate is not lowered, and the sealability of the cell case is ensured.

17 Claims, 7 Drawing Sheets

(51) Int. Cl.
*H01M 2/08* (2006.01)
*H01M 2/30* (2006.01)

(56) References Cited

U.S. PATENT DOCUMENTS

2007/0202364 A1* 8/2007 Uh et al. .................. 429/7
2011/0287310 A1* 11/2011 Byun et al. ............... 429/181

FOREIGN PATENT DOCUMENTS

| JP | 7-183011 A | 7/1995 |
|----|----|----|
| JP | 2000-021437 A | 1/2000 |
| JP | 2002-184365 A | 6/2002 |
| JP | 2002-304973 A | 10/2002 |
| JP | 2009-134985 A | 6/2009 |
| JP | 2011-159582 A | 8/2011 |

OTHER PUBLICATIONS

Machine Translation of Hiroyasu (JP 2009-134985, published Jun. 2009, pp. 1-45).*
International Search Report in PCT/JP2011/072108 dated Jan. 10, 2012(English Translation Thereof).

* cited by examiner

CELL AND METHOD FOR MANUFACTURING CELL

FIELD OF THE INVENTION

The present invention relates to a cell and a method for manufacturing a cell. More particularly, the present invention relates to a cell in which a peripheral edge portion of an opening portion of a battery case that accommodates an electrode assembly and a peripheral edge portion of an outer surface of a cover plate are laser-welded together so as to close the opening portion formed in the battery case by the cover plate, and a method for manufacturing the cell.

RELATED ART

Conventionally, there are various types of cells. As shown in FIG. 7, each of the cells includes an electrode assembly (not shown), a cell case 10 that accommodates the electrode assembly, and a connection terminal 310 that is arranged outside the cell case 10 and connected with a connection object such as a cable or a bus bar.

The cell case 10 includes a battery case 10a in which an opening portion for accommodating the electrode assembly is formed at one end, and a cover plate 10b that closes the opening portion of the battery case 10a. As shown in FIG. 8, the connection terminal 310 is arranged on an outer surface (outside) of the cover plate 10b. The connection terminal 310 is electrically connected to the electrode assembly via a connection member 312 such as a rivet that passes through the cover plate 10b, and a current collecting member (not shown) connected to the connection member 312 within the cell case 10. In FIG. 8, the connection member 312 is formed integrally with the connection terminal 310. However, it is possible to employ a configuration in which the connection member 312 is composed of, for example, a shaft-shaped rivet that passes through the cover plate 10b, an upper end portion of the connection member 3 is coupled to a plate-shaped connection strip (not shown) coupled to a lower end portion of the connection terminal 310, and a lower end portion of the connection member 3 is coupled to the current collecting member.

In a cell 1 of this type, since the connection member 312 passes through the cover plate 10b as described above, an insulating gasket 21 is interposed between the cover plate 10b and the connection terminal 310 so as to ensure sealability within the cell case 10 and electrical insulating properties between the connection terminal 310 and the cell case 10. That is, since the insulating gasket 21 is interposed between the cover plate 10b and the connection terminal 310, electrolytic solution or gas within the cell case 10 is prevented from leaking from a gap between the cover plate 10b and the connection member 312, and short circuit between the cell case 10 and the connection terminal 310 is prevented.

Incidentally, in the cell 1 of this type, after the cover plate 10b is fitted to the opening portion of the battery case 10a, a peripheral edge portion (an outer peripheral edge portion) P of the outer surface of the cover plate 10b and a peripheral edge portion (an opening peripheral edge portion) of the opening portion of the battery case 10 are laser-welded together to close the opening portion of the battery case 10a.

The insulating gasket 21 is simply interposed between the cover plate 10b and the connection terminal 310. An outer peripheral surface of the insulating gasket 21 is completely exposed. Thus, when the battery case 10a and the cover plate 10b are laser-welded together, high-temperature spatter S scattered in a parabolic shape from a molten portion (a position to be welded) may be attached to (the outer peripheral surface of) the insulating gasket 21 to damage the insulating gasket 21. When the outer peripheral surface of the insulating gasket 21, especially, a lower end portion thereof is damaged, adhesion between the insulating gasket 21 and the cover plate 10b may be lowered, and the sealability of the cell case 10 may be thereby lowered.

CITATION LIST

Patent Document

Patent Document 1: Japanese Patent Laid-Open No. 2002-184365

DISCLOSURE OF THE INVENTION

Problems to be Solved by the Invention

Hence, it is an object of the present invention, in view of such circumstances as described above, to provide a cell capable of preventing damage to an insulating gasket when a battery case and a cover plate are laser-welded together, and thereby ensuring sealability of a cell case using the insulating gasket, and a method for manufacturing the cell.

Means for Solving Problems

According to the present invention, there is provided a cell, which includes:
  an electrode assembly;
  a battery case that includes an opening portion at one end so as to accommodate the electrode assembly inside thereof;
  a cover plate that closes the opening portion of the battery case, a peripheral edge portion of an outer surface of the cover plate and a peripheral edge portion of the opening portion of the battery case being welded together to form a weld line;
  a connection terminal that is arranged on the outer surface of the cover plate and electrically connected with a connection object;
  a connection member that is inserted through the cover plate to electrically connect the connection terminal and the electrode assembly;
  an insulating gasket that is interposed between the cover plate and the connection terminal; and
  a shielding member that is arranged between the weld line and at least a portion of the insulating gasket adjacent to the weld line.

Here, the cell according to one aspect of the present invention may have a configuration in which:
  a distance from the outer surface of the cover plate to an upper end of an outer peripheral surface of the insulating gasket is greater than a distance from the outer surface of the cover plate to an upper end of an outer peripheral surface of the shielding member.

Also, the cell according to another aspect of the present invention may have a configuration in which:
  the insulating gasket includes:
    an installation portion arranged on the outer surface of the cover plate; and
    a flanged portion provided in continuity with an upper end of the installation portion,
    the flanged portion being formed such that an outer peripheral surface thereof projects outward of an outer peripheral surface of the installation portion, and
    the shielding member being formed in an annular shape, and externally fitted to the installation portion.

Also, the cell according to another aspect of the present invention may have a configuration in which:

the outer peripheral surface of the insulating gasket is located inward of a straight line connecting the upper end of the outer peripheral surface of the shielding member and the peripheral edge portion of the outer surface of the cover plate.

Also, the cell according to yet another aspect of the present invention may have a configuration in which:

the shielding member is formed in an annular shape, and externally fitted to the insulating gasket, and an inner periphery of the shielding member and an outer periphery of at least a portion of the insulating gasket to which the shielding member is externally fitted is formed in a non-circular shape having a same or a substantially same size.

In this case, the cell may have a configuration in which:

the connection terminal and the connection member are integrally formed to constitute an external terminal, the insulating gasket includes a concave portion into which a predetermined position of the external terminal is fitted, and the predetermined position of the external terminal and the concave portion of the insulating gasket are formed in a non-circular shape having a same or a substantially same size.

Also, the cell according to another aspect of the present invention may have a configuration in which:

the shielding member is made of a metal material.

Also, the cell according to another aspect of the present invention may have a configuration in which:

the shielding member is formed integrally with the cover plate.

According to the present invention, there is further provided a method for manufacturing a cell, which includes:

a providing step of providing an electrode assembly, a battery case, a cover plate, a connection terminal, a connection member, an insulating gasket, and a shielding member;

an assembling step of arranging the insulating gasket on one surface of the cover plate, inserting the connection member through the cover plate and the insulating gasket, and thereafter electrically connecting the electrode assembly and the connection terminal via the connection member; and a sealing step of accommodating the electrode assembly within the battery case from an opening portion of the battery case after the assembling step, closing the opening portion of the battery case by the cover plate such that the one surface of the cover plate becomes an outer surface, and thereafter sealing a peripheral edge portion of the outer surface of the cover plate and a peripheral edge portion of the opening portion of the battery case by laser welding, the method further including, before the sealing step, a shielding member arranging step of arranging the shielding member between a position to be welded (welding scheduled position) as a portion where the peripheral edge portion of the outer surface of the cover plate and the peripheral edge portion of the opening portion of the battery case are welded together, and at least a portion of the insulating gasket adjacent to the position to be welded (welding scheduled position).

DETAILED DESCRIPTION OF THE PREFERRED EMBODIMENT

Figure 1:
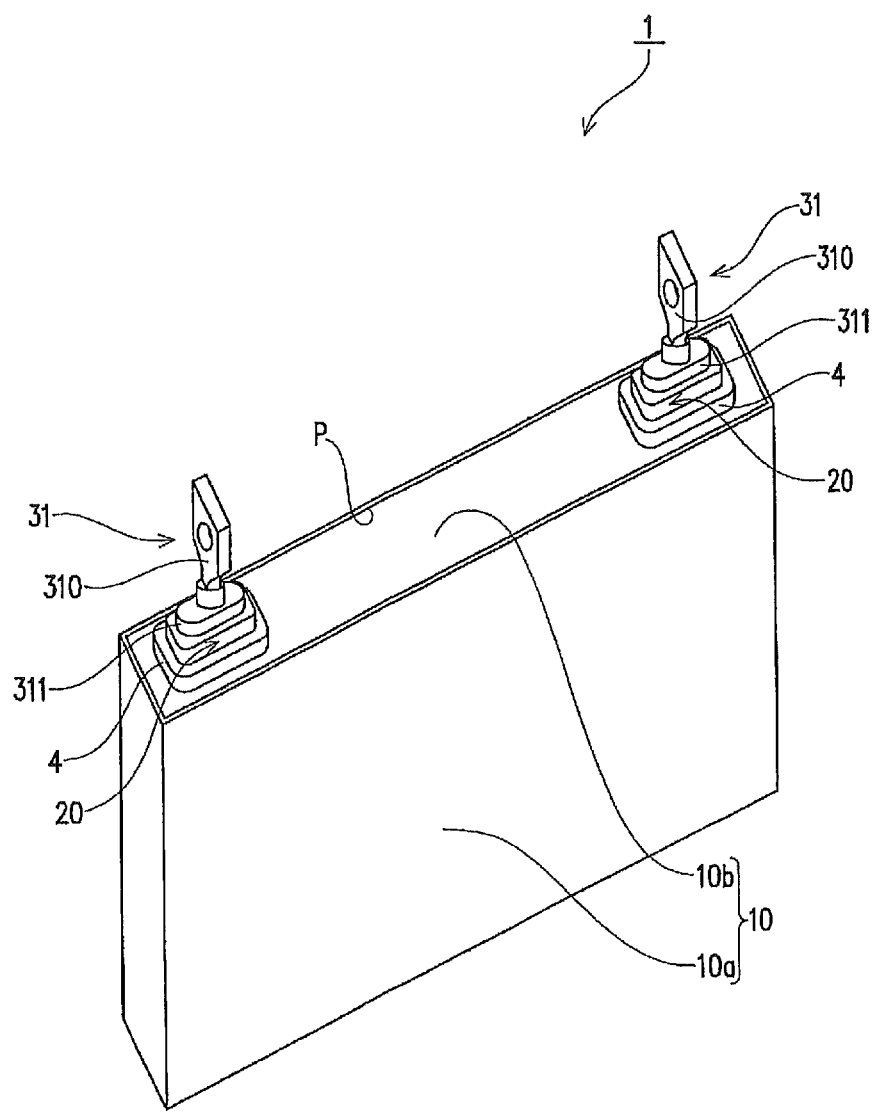
FIG. 1 illustrates an overall perspective view of a cell according to a present embodiment.

Hereinafter, a cell according to one embodiment of the present invention will be described, and an outline of the cell according to the present embodiment will be first described.

The cell according to the present embodiment includes:

an electrode assembly;

a battery case that includes an opening portion at one end so as to accommodate the electrode assembly inside thereof;

a cover plate that closes the opening portion of the battery case, a peripheral edge portion of an outer surface of the cover plate and a peripheral edge portion of the opening portion of the battery case being welded together to form a weld line;

a connection terminal that is arranged on the outer surface of the cover plate and electrically connected with a connection object;

a connection member that is inserted through the cover plate to electrically connect the connection terminal and the electrode assembly;

an insulating gasket that is interposed between the cover plate and the connection terminal; and a shielding member that is arranged between the weld line and at least a portion of the insulating gasket adjacent to the weld line.

According to the above configuration, even when high-temperature spatter produced from a molten portion resulting from welding when the peripheral edge portion of the outer surface of the cover plate and the peripheral edge portion of the opening portion of the battery case are welded together is scattered in a parabolic shape toward the insulating gasket from the molten portion, the spatter is not attached to the insulating gasket. This is because the shielding member blocks the spatter scattered toward the insulating gasket. Thus, the insulating gasket is not damaged by the spatter. Accordingly, adhesion between the insulating gasket and the cover plate is not lowered. Sealability of a cell case using the insulating gasket can be thereby ensured.

Here, as one aspect of the cell according to the present embodiment, a distance from the outer surface of the cover plate to an upper end of an outer peripheral surface of the insulating gasket may be greater than a distance from the outer surface of the cover plate to an upper end of an outer peripheral surface of the shielding member.

According to the above configuration, little water or dust accumulates on the insulating gasket. Accordingly, an increase in contact resistance between the connection terminal and the connection object can be prevented.

Also, as another aspect of the cell according to the present embodiment, the insulating gasket may include:

an installation portion arranged on the outer surface of the cover plate; and a flanged portion provided in continuity with an upper end of the installation portion, the flanged portion being formed such that an outer peripheral surface thereof projects outward of an outer peripheral surface of the installation portion, and the shielding member being formed in an annular shape, and externally fitted to the installation portion.

According to the above configuration, the installation portion (a lower end portion) of the insulating gasket is covered with the shielding member. Accordingly, the spatter is not attached to the installation portion (the lower end portion) of the insulating gasket. That is, the shielding member can completely block the spatter scattered toward the installation portion (the lower end portion) of the insulating gasket.

Also, as another aspect of the cell according to the present embodiment, the outer peripheral surface of the insulating gasket may be located inward of a straight line connecting the upper end of the outer peripheral surface of the shielding member and the peripheral edge portion of the outer surface of the cover plate.

According to the above configuration, the shielding member can block not only the spatter, but also laser light reflected from the molten portion. Accordingly, the insulating gasket can be prevented from being deteriorated due to the reflected laser light.

Also, as yet another aspect of the cell according to the present embodiment, the shielding member may be formed in an annular shape, and externally fitted to the insulating gasket, and an inner periphery of the shielding member and an outer periphery of at least a portion of the insulating gasket to which the shielding member is externally fitted may be formed in a non-circular shape having a same or a substantially same size.

According to the above configuration, the shielding member can prevent the insulating gasket from being unintentionally rotated in addition to blocking the spatter scattered toward the insulating gasket.

In this case, it is possible to employ a configuration, in which the connection terminal and the connection member are integrally formed to constitute an external terminal, the insulating gasket includes a concave portion into which a predetermined position of the external terminal is fitted, and the predetermined position of the external terminal and the concave portion of the insulating gasket are formed in a non-circular shape having a same or a substantially same size.

According to the above configuration, the insulating gasket can prevent the external terminal, i.e., the connection terminal from being unintentionally rotated. Accordingly, the shielding member can prevent the external terminal from being unintentionally rotated via the insulating gasket in addition to blocking the spatter scattered toward the insulating gasket.

Also, as another aspect of the cell according to the present embodiment, the shielding member may be made of a metal material.

The metal material is hardly damaged by laser light or spatter. That is, the metal material has a high reflectance with respect to laser light, and a high melting point. Accordingly, damage to the shielding member can be more reliably prevented.

Also, as another aspect of the cell according to the present embodiment, the shielding member may be formed integrally with the cover plate.

According to the above configuration, the number of parts can be reduced, and the number of manufacturing steps can be thereby reduced.

A method for manufacturing a cell according to the present embodiment includes:

a providing step of providing an electrode assembly, a battery case, a cover plate, a connection terminal, a connection member, an insulating gasket, and a shielding member;

an assembling step of arranging the insulating gasket on one surface of the cover plate, inserting the connection member through the cover plate and the insulating gasket, and thereafter electrically connecting the electrode assembly and the connection terminal via the connection member; and a sealing step of accommodating the electrode assembly within the battery case from an opening portion of the battery case after the assembling step, closing the opening portion of the battery case by the cover plate such that the one surface of the cover plate becomes an outer surface, and thereafter sealing a peripheral edge portion of the outer surface of the cover plate and a peripheral edge portion of the opening portion of the battery case by laser welding, the method further including, before the sealing step, a shielding member arranging step of arranging the shielding member between a position to be welded as a portion where the peripheral edge portion of the outer surface of the cover plate and the peripheral edge portion of the opening portion of the battery case are welded together, and at least a portion of the insulating gasket adjacent to the position to be welded.

According to the above manufacturing method, even when high-temperature spatter produced from a molten portion resulting from welding when the peripheral edge portion of the outer surface of the cover plate and the peripheral edge portion of the opening portion of the battery case are welded together is scattered in a parabolic shape toward the insulating gasket from the molten portion in the sealing step, the spatter is not attached to the insulating gasket. This is because the shielding member blocks the spatter scattered toward the insulating gasket. Thus, the insulating gasket is not damaged by the spatter. Accordingly, adhesion between the insulating gasket and the cover plate is not lowered. Sealability of a cell case using the insulating gasket can be thereby ensured.

Next, the cell according to the present embodiment will be described in detail with reference to the accompanying drawings.

Figure 2:
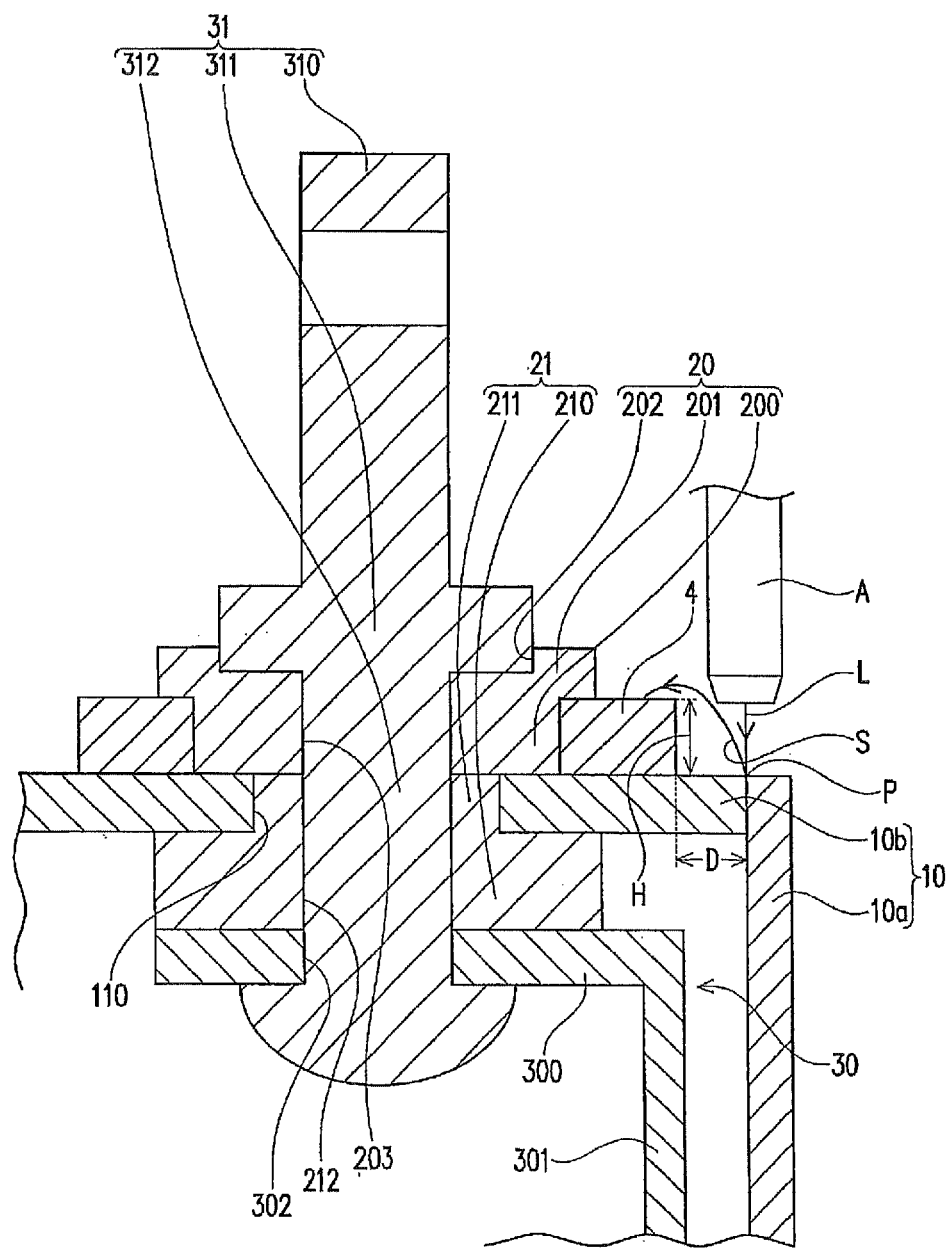
FIG. 2 illustrates a main portion enlarged sectional view of the cell.

As shown in FIGS. 1 and 2, the cell according to the present embodiment includes a battery case 10*a* that includes an opening portion at one end so as to accommodate an electrode assembly (not shown), a cover plate 10*b* that seals the opening portion of the battery case 10*a*, a connection terminal 310 that is arranged on an outer surface of the cover plate 10*b* and connected with a connection object such as a cable or a bus bar, a rivet portion 312 (see FIG. 2) as a connection member that is inserted through the cover plate 10*b* to electrically connect the connection terminal 310 and the electrode assembly, an insulating gasket (hereinafter, the insulating gasket is referred to as "upper insulating gasket") 20 that is interposed between the cover plate 10*b* and the connection terminal 310, and a shielding member 4 that surrounds at least a lower end portion (hereinafter referred to as "upper installation portion") 200 of the upper insulating gasket 20. As shown in FIG. 2, a cell 1 according to the present embodiment also includes a current collecting member 30 that connects the electrode assembly and the connection terminal 310 in conjunction with the rivet portion 312. Accordingly, the cell 1 according to the present embodiment further includes a lower insulating gasket 21 that is arranged on an inner surface of the cover plate 10*b* so as to insulate the current collecting member 30 from the cover plate 10*b* in addition to the upper insulating gasket 20.

In the cell 1 according to the present embodiment, a peripheral edge portion of the outer surface of the cover plate 10*b* and a peripheral edge portion of the opening portion of the battery case 10a are laser-welded together to seal the opening portion of the battery case 10a. The battery case 10a and the cover plate 10b are thereby integrated together to form a cell case 10.

The cell case 10 is formed in a box-like shape by fitting the cover plate 10b to the opening portion of the battery case 10a, and laser-welding the peripheral edge portion of the outer surface of the cover plate 10b. A through hole 110 for inserting the rivet portion 312 is provided through the cover plate 10b.

The connection terminal 310 is formed integrally with the rivet portion 312. That is, an external terminal 31 obtained by integrally forming the connection terminal 310 and the rivet portion 312 is used in the cell 1 according to the present embodiment. The external terminal 31 includes the connection terminal 310, a collar portion 311 provided in continuity with one end of the connection terminal 310, and the rivet portion 312 provided in continuity with the collar portion 311. In the external terminal 31, the connection terminal 310, the collar portion 311, and the rivet portion 312 are integrally formed by machining a metal rod having conductivity. Specifically, the connection terminal 310 is formed flatly by pressing one end side of the metal rod. The collar portion 311 is set to a larger outer diameter than those of the connection terminal 310 and the rivet portion 312.

The rivet portion 312 is formed in a rod-like shape. The rivet portion 312 is provided in continuity with the collar portion 311 at one end of the rivet portion 312 so as to be concentric or substantially concentric with the collar portion 311. The rivet portion 312 extends in an opposing direction (an opposite direction) to the connection terminal 310 from the collar portion 311. The rivet portion 312 is set to such a length that the other end side (a distal end portion) projects inward of the cover plate 10b (into the battery case 10a) with the rivet portion 312 being inserted through the upper insulating gasket 20, the lower insulating gasket 21, and the current collecting member 30 (a first insertion hole 302, a second insertion hole 203, and a third insertion hole 212 described below) in a laminated state. The rivet portion 312 electrically and mechanically connects the connection terminal 310 and the current collecting member 30 with the distal end portion projecting inward of the cover plate 10b (into the cell case 10) being caulked.

The upper insulating gasket 20 is made of a material having electrical insulating properties (resin). The upper insulating gasket 20 includes the upper installation portion 200 arranged on the outer surface of the cover plate 10b, and a flanged portion (hereinafter referred to as "upper flanged portion") 201 provided in continuity with an upper end of the upper installation portion 200. The upper flanged portion 201 is formed such that an outer peripheral surface projects outward (in a direction along the cover plate 10b) of an outer peripheral surface of the upper installation portion 200. A concave portion 202, to which the collar portion 311 can be fitted, is formed in the upper flanged portion 201. The second insertion hole 203 capable of inserting the rivet portion 312 is provided through the upper insulating gasket 20. The second insertion hole 203 is set to such a hole diameter that an inner peripheral surface of the second insertion hole 203 comes into close contact with an outer peripheral surface of the rivet portion 312 with no gap therebetween when the rivet portion 312 is inserted therethrough.

The shielding member 4 surrounds at least the upper installation portion 200 of the upper insulating gasket 20 inward of the peripheral edge portion of the cover plate 10b. To be more specific, in the present embodiment, a distance from the outer surface of the cover plate 10b to an upper end of an outer peripheral surface of the shielding member 4 is smaller than a distance from the outer surface of the cover plate 10b to an upper end of an outer peripheral surface of the upper insulating gasket 20 (in other words, the distance from the outer surface of the cover plate 10b to the upper end of the outer peripheral surface of the upper insulating gasket 20 is greater than the distance from the outer surface of the cover plate 10b to the upper end of the outer peripheral surface of the shielding member 4). Therefore, the shielding member 4 surrounds the upper installation portion 200 of the upper insulating gasket 20. Thus, an upper end portion (the upper flanged portion 201) of the upper insulating gasket 20 is exposed from the shielding member 4.

The shielding member 4 is made of a metal material such as aluminum, heat-resistant resin such as PPS (polyphenylene sulfide) or PEEK (polyether ether ketone), or the like. The shielding member 4 is formed in an endless annular shape, and surrounds the entire periphery of the upper insulating gasket 20. To be more specific, an inner peripheral surface of the shielding member 4 and the outer peripheral surface of the upper installation portion 200 are in close contact with no gap therebetween with the shielding member 4 being externally fitted to the upper installation portion 200 of the upper insulating gasket 20.

The shielding member 4 is formed such that a distance from the outer surface of the cover plate 10b to the upper end of the outer peripheral surface of the shielding member 4, i.e., a height H from a proximal end to a distal end is at least 3 mm. The shielding member 4 is also configured such that the outer peripheral surface thereof is located inward of the peripheral edge portion of the outer surface of the cover plate 10b (such that a distance D between the outer peripheral surface of the shielding member 4 and the peripheral edge portion of the outer surface of the cover plate 10b is 1 mm or less).

The current collecting member 30 is formed by bending a metal plate, and includes a connecting portion 300 connected to the external terminal 31 (the connection terminal 310 via the rivet portion 312), and an electrode connecting portion 301 extending from one end of the connecting portion 300 and connected to the electrode assembly. The current collecting member 30 of this type is generally formed in an L shape. One side thereof constitutes the connecting portion 300, and the other side thereof constitutes the electrode connecting portion 301. The first insertion hole 302 capable of inserting the rivet portion 312 is provided through the current collecting member 30. The first insertion hole 302 is set to such a hole diameter that an inner peripheral surface of the first insertion hole 302 comes into close contact with the outer peripheral surface of the rivet portion 312 with no gap therebetween when the rivet portion 312 is inserted therethrough.

The lower insulating gasket 21 includes an installation portion (hereinafter referred to as "lower installation portion") 210 arranged on the inner surface of the cover plate 10b, and a small diameter portion 211 provided in continuity with an upper end of the lower installation portion 210. The small diameter portion 211 is formed capable of being fitted to the through hole 110 of the cover plate 10b. The lower installation portion 210 is formed so as to be in close contact with the inner surface of the cover plate 10b with the small diameter portion 211 being fitted to the through hole 110. The small diameter portion 211 is set to such an outer diameter that an outer peripheral surface of the small diameter portion 211 comes into close contact with an inner peripheral surface of the through hole 110 with no gap therebetween when the small diameter portion 211 is fitted to the through hole 110.

The third insertion hole 212 capable of inserting the rivet portion 312 is provided through the lower insulating gasket

21. The third insertion hole 212 is set to such a hole diameter that an inner peripheral surface of the third insertion hole 212 comes into close contact with the outer peripheral surface of the rivet portion 312 with no gap therebetween when the rivet portion 312 is inserted therethrough.

As described above, in the cell 1 according to the present embodiment, the upper insulating gasket 20 where the shielding member 4 is externally fitted to the upper installation portion 200 is arranged on the outer surface of the cover plate 10b, and the upper insulating gasket 21 is arranged on the inner surface of the cover plate 10b. Also, the rivet portion 312 is inserted through the first insertion hole 302, the second insertion hole 203, and the third insertion hole 212, so that the collar portion 311 of the external terminal 31 is fitted to the concave portion 202 of the upper insulating gasket 20 to bring the connection terminal 310 into an upright state from the collar portion 311. The distal end portion of the rivet portion 312 projecting into the cell case 10 is caulked to compress the upper insulating gasket 20 and the lower insulating gasket 21. Accordingly, sealability within the cell case 10 is ensured.

Subsequently, a method for manufacturing the cell 1 according to the present embodiment will be described.

The method for manufacturing the cell 1 according to the present embodiment includes: a providing step of providing the electrode assembly, the battery case 10a, the cover plate 10b, the connection terminal 310, the rivet portion 312, the upper insulating gasket 20, the lower insulating gasket 21, and the shielding member 4; an assembling step of arranging the upper insulating gasket 20 on the outer surface of the cover plate 10b, arranging the lower insulating gasket 21 on the inner surface of the cover plate 10b, inserting the rivet portion 312 through the cover plate 10b, the upper insulating gasket 20, and the lower insulating gasket 21, and thereafter electrically connecting the electrode assembly and the connection terminal 310 via the rivet portion 312; and a sealing step of accommodating the electrode assembly within the battery case 10a from the opening portion of the battery case 10a after the assembling step, closing the opening portion of the battery case 10a by the cover plate 10b, and thereafter sealing the opening portion of the cell case 10 by laser-welding the peripheral edge portion of the outer surface of the cover plate 10b and the peripheral edge portion of the opening portion of the battery case 10a.

The method for manufacturing the cell 1 according to the present embodiment further includes, as a pre-step of the sealing step, a shielding member arranging step of arranging the shielding member 4 at a position to surround at least the upper installation portion 200 of the outer peripheral surface of the upper insulating gasket 20, the position being located inward of the peripheral edge portion of the cover plate 10b.

Specifically, after the annular shielding member 4 is externally fitted to the upper installation portion 200 of the upper insulating gasket 20, the upper insulating gasket 20 is arranged on the outer surface of the cover plate 10b. In this state, the shielding member 4 is arranged at a position inward of the peripheral edge portion of the cover plate 10b on the outer surface of the cover plate 10b. The lower insulating gasket 21 is arranged on the inner surface of the cover plate 10b, and the connecting portion 300 of the current collecting member 30 is arranged at the lower insulating gasket 21 (the lower installation portion 210). In this state, the small diameter portion 211 of the lower insulating gasket 21 comes into a fitted state into the through hole 110, and an abutting state against a lower surface of the upper insulating gasket 20 (the upper installation portion 200) arranged on the outer surface of the cover plate 10b. Also, the upper insulating gasket 20, the lower insulating gasket 21, and the current collecting member 30 come into a laminated state, and the first insertion hole 302, the second insertion hole 203, and the third insertion hole 212 are thereby integrated together to form an insertion hole for inserting the rivet portion 312.

Thereafter, the rivet portion 312 is inserted through the upper insulating gasket 20, the upper insulating gasket 21, and the current collecting member 30 in a laminated state (the first insertion hole 302, the second insertion hole 203, and the third insertion hole 212), and the distal end portion of the rivet portion 312 projecting inward of the cover plate 10b (into the battery case 10a) is caulked. Accordingly, the connection terminal 310 is electrically and mechanically connected to the current collecting member 30, and the upper insulating gasket 20 and the lower insulating gasket 21 are compressed to seal a space between the through hole 110 and the rivet portion 312. When the electrode assembly is mounted to the current collecting member 30 before the rivet portion 312 is caulked as described above, the electrode assembly interferes therewith. Therefore, the electrode assembly is normally connected to the current collecting member 30 after the current collecting member 30 is coupled to the connection terminal 310.

As described above, in a state in which the external terminal 31 (the connection terminal 310, the rivet portion 312), the upper insulating gasket 20, and the lower insulating gasket 21 are assembled (the assembling step is completed), the respective elements are fixed to the cover plate 10b, and the upper installation portion 200 of the upper insulating gasket 20 is surrounded and completely covered with the shielding member 4.

A peripheral edge portion P of the outer surface of the cover plate 10b and the peripheral edge portion of the opening portion of the battery case 10a are laser-welded together with the cover plate 10b being fitted to the battery case 10a. In the laser welding, high-temperature spatter S scattered all around in a parabolic shape from a molten portion (a portion irradiated with laser light L emitted from a laser welding machine A) is produced. However, a portion of the spatter S scattered toward the upper installation portion 200 of the upper insulating gasket 20 is attached to the shielding member 4. That is, the shielding member 4 can block the spatter S scattered toward the upper installation portion 200 of the upper insulating gasket 20. Therefore, the upper installation portion 200 of the upper insulating gasket 20 is not damaged, and adhesion with the cover plate 10b is not lowered.

As described above, in the cell 1 and the method for manufacturing the cell 1 according to the present embodiment, damage to the upper insulating gasket 20 can be prevented when the battery case 10a and the cover plate 10b are welded together, so that an excellent effect that the sealability of the cell case 10 using the upper insulating gasket 20 can be ensured is obtained.

Note that the present invention is not limited to the aforementioned embodiment, and it is needless to say that the present invention can be modified as appropriate, without departing from the gist of the invention.

In the aforementioned embodiment, the shielding member 4 is provided separately from the cover plate 10b. However, the shielding member 4 may be formed integrally with the cover plate 10b.

Also, the material of the shielding member 4 is not specifically limited. However, a material that is hardly burned by laser light or spatter, that is, a material having a high reflectance and a high melting point is preferably used as the shielding member 4, and a metal material is thus preferably used. In the case where the shielding member 4 made of a metal material is used, the cover plate 10b and the external terminal 31 may short-circuit via the shielding member 4 due to water or dust accumulating on the upper insulating gasket 20 when the height of the upper insulating gasket 20 from the cover plate 10*b* (the distance from the outer surface of the cover plate 10*b* to the upper end of the outer peripheral surface of the upper insulating gasket 20) is smaller than the height of the shielding member 4 from the cover plate 10*b* (the distance from the outer surface of the cover plate to the upper end of the outer peripheral surface of the shielding member). Thus, when the shielding member 4 made of a metal material is used, the height of the upper insulating gasket 20 from the cover plate 10*b* is preferably greater than the height of the shielding member 4 from the cover plate 10*b*.

Also, the shielding member 4 may be provided so as to further reduce the distance D between the outer peripheral surface thereof and the peripheral edge portion of the outer surface of the cover plate 10*b*. In this case, the spatter S scattered when the laser welding is performed is mostly attached to the outer peripheral surface of the shielding member 4. Thus, the spatter is much less likely to come into contact with the upper insulating gasket 20 beyond the upper end portion of the shielding member 4.

Also, in the aforementioned embodiment, the upper insulating gasket 20 includes the upper installation portion 200 and the flanged portion 201, and the shielding member 4 is externally fitted to the upper installation portion 200. However, the present invention is not limited thereto. For example, the upper insulating gasket 20 may be formed in a uniform size from the upper end to the lower end, and the upper insulating gasket 20 may be surrounded by the shielding member 4.

Also, in the aforementioned embodiment, (a sectional shape of) the upper installation portion 200 of the upper insulating gasket 20 is formed in a rectangular shape (see FIGS. 1 and 2). However, the present invention is not limited thereto. For example, (the sectional shape of) the upper installation portion 200 may have a circular, oval, or square shape. When (the sectional shape of) the upper installation portion 200 is formed in a non-circular shape such as a rectangular or oval shape, and the shielding member 4 is in close contact with the upper installation portion 200, the shielding member 4 can make it difficult for the upper insulating gasket 20 to rotate in addition to blocking the spatter S scattered toward the upper installation portion 200 of the upper insulating gasket 20.

Also, when (respective sectional shapes of) an inner periphery of the shielding member 4 and an outer periphery of the upper installation portion 200 are formed in a non-circular shape such as a rectangular or oval shape having the same or substantially the same size, the shielding member 4 can prevent the upper installation portion 200 (the upper insulating gasket 20) from being rotated in addition to blocking the spatter S scattered toward the upper installation portion 200 of the upper insulating gasket 20.

Also, in addition to the aforementioned configuration, when (respective sectional shapes of) an outer periphery of the collar portion 311 and the concave portion 202 of the flanged portion 201 are formed in a non-circular shape such as a rectangular or oval shape having the same or substantially the same size, the flanged portion 201 can prevent the external terminal 31 from being rotated. Accordingly, the shielding member 4 can prevent the external terminal 31 from being rotated via the upper insulating gasket 20 in addition to blocking the spatter S scattered toward the upper installation portion 200 of the upper insulating gasket 20.

Figure 3:
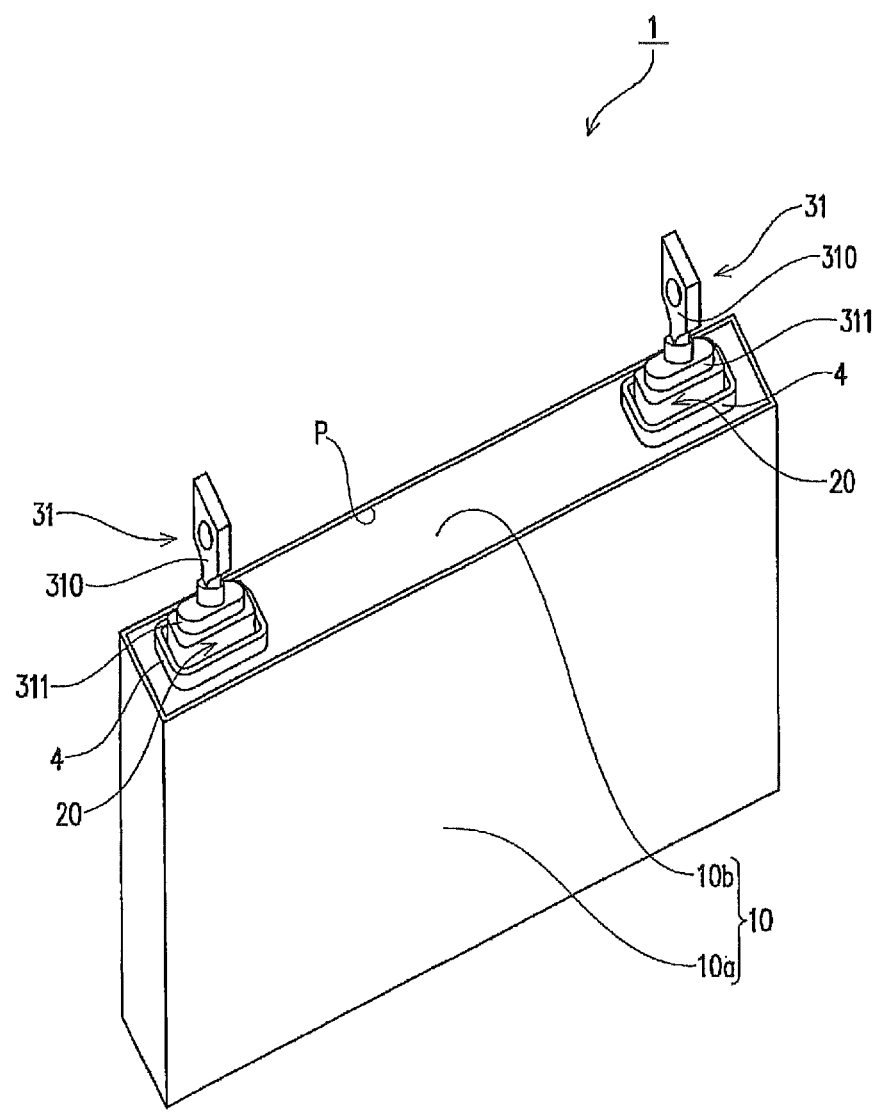
FIG. 3 illustrates an overall perspective view of a cell according to another embodiment.
Figure 4:
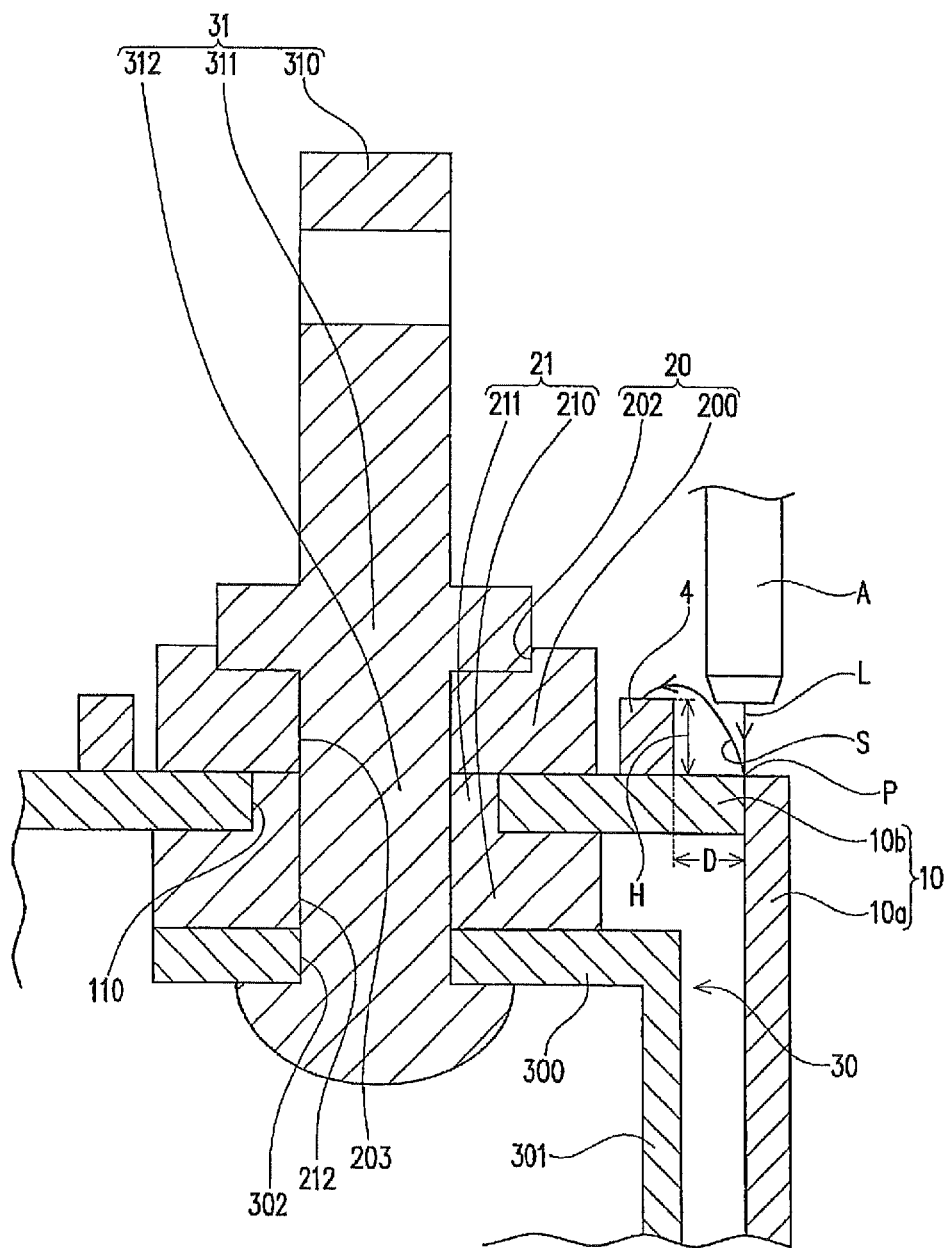
FIG. 4 illustrates a main portion enlarged sectional view of the cell.

Also, in the aforementioned embodiment, the shielding member 4 is in close contact with the upper insulating gasket 20. However, the present invention is not limited thereto. For example, the inner peripheral surface of the shielding member 4 may be apart from the outer peripheral surface of the upper insulating gasket 20 as shown in FIGS. 3 and 4.

Figure 5:
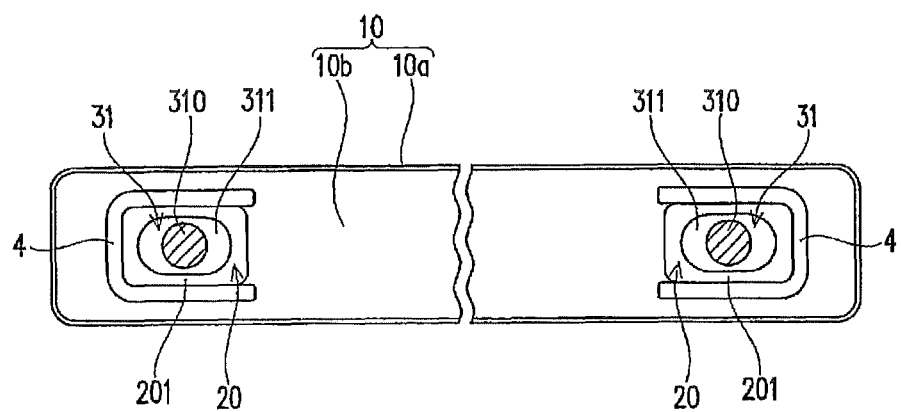
FIG. 5 illustrates a main portion enlarged plan view of a cell according to another embodiment.
Figure 6:
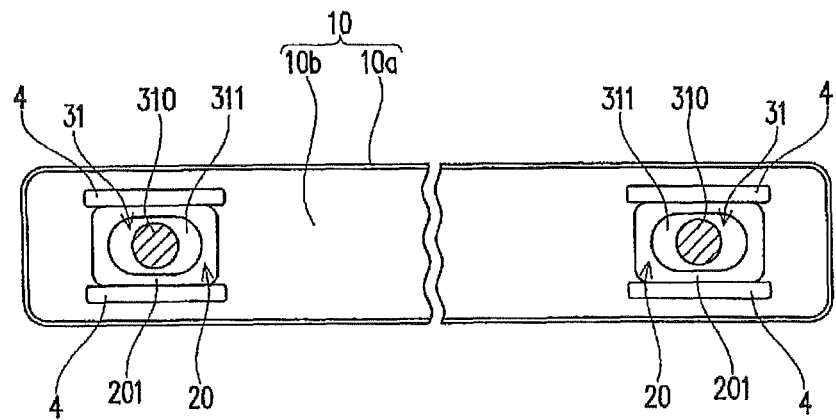
FIG. 6 illustrates a main portion enlarged plan view of a cell according to yet another embodiment.
Figure 7:
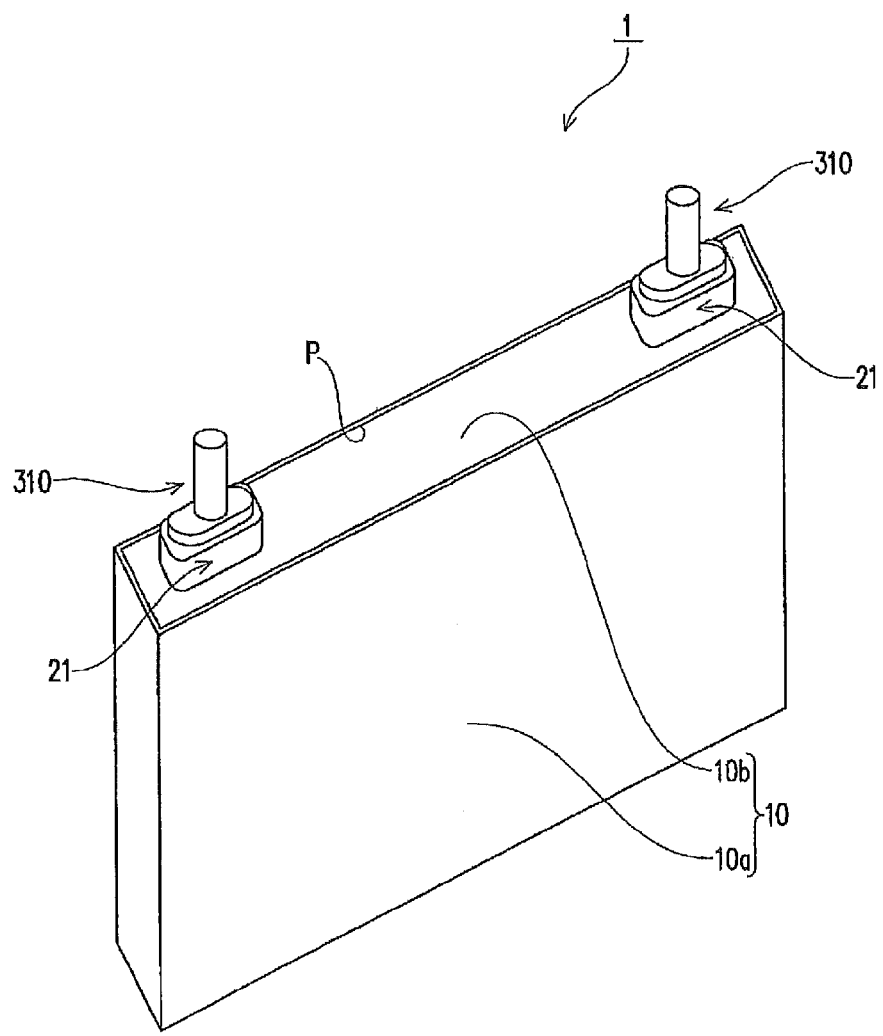
FIG. 7 illustrates an overall perspective view of a conventional cell.
Figure 8:
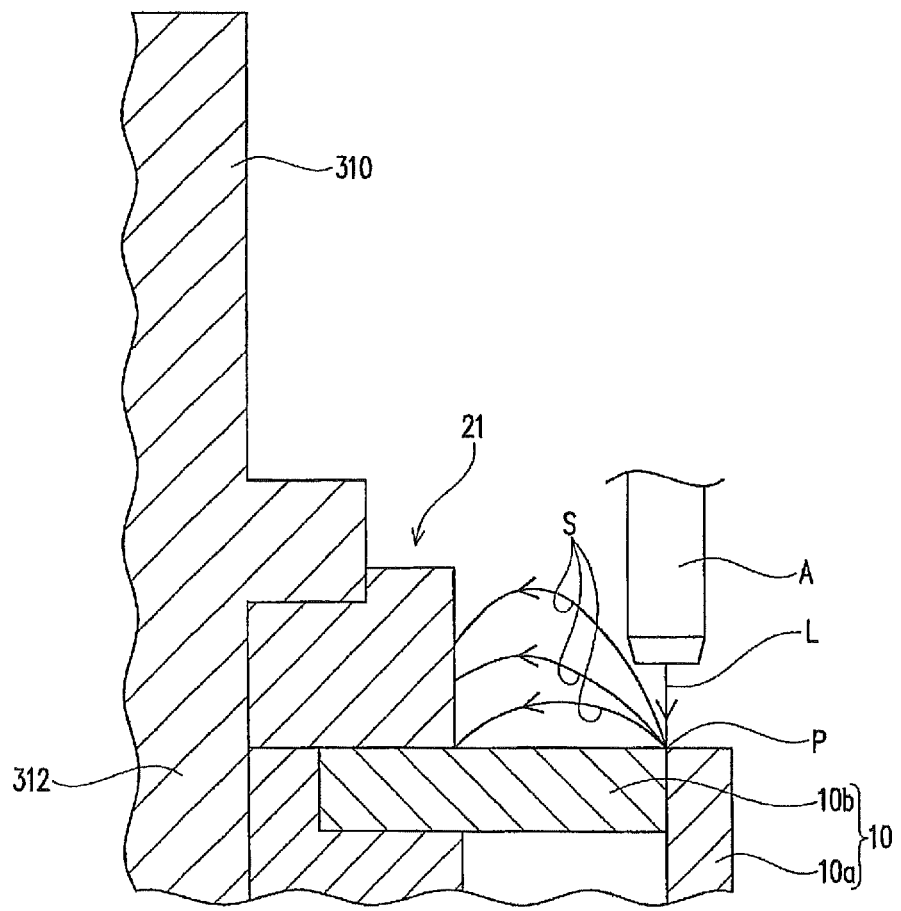
FIG. 8 illustrates a main portion enlarged sectional view of the cell.

Also, in the aforementioned embodiment, the shielding member 4 is formed in an endless annular shape, and arranged so as to surround the entire periphery of the upper insulating gasket 20. However, the present invention is not limited thereto. For example, a portion of the shielding member 4 located toward a longitudinal center portion of the cover plate 10*b* is sufficiently apart from the peripheral edge portion of the cover plate 10*b*. Thus, the spatter S is unlikely to be attached to the outer peripheral surface of the upper insulating gasket 20 even when the shielding member 4 is not provided. In this sense, the shielding member 4 may be arranged at least between the upper insulating gasket 20 and the peripheral edge portion in the longitudinal direction of the cover plate 10*b*, and between the upper insulating gasket 20 and the peripheral edge portion in a direction orthogonal to the longitudinal direction (a short direction), that is, at least on three sides as shown in FIG. 5 (protection of three surfaces of the upper insulating gasket 20). In the case where the upper insulating gasket 20 is arranged such that a distance between the outer peripheral surface of the upper insulating gasket 20 and the peripheral edge portion of the outer surface of the cover plate 10*b* in the longitudinal direction of the cover plate 10*b* is greater than a distance between the outer peripheral surface of the upper insulating gasket 20 and the peripheral edge portion of the outer surface of the cover plate 10*b* in the short direction of the cover plate 10*b*, the shielding member 4 may be arranged at least between the upper insulating gasket 20 and the peripheral edge portion in the short direction of the cover plate 10*b*, that is, at least on opposing two sides as shown in FIG. 6 (protection of two surfaces of the upper insulating gasket 20). In short, the shielding member 4 may be arranged between a weld line obtained by welding the peripheral edge portion of the outer surface of the cover plate 10*b* and the peripheral edge portion of the opening portion of the battery case 10*a*, and at least a portion of the upper insulating gasket 20 adjacent to the weld line.

Also, in the aforementioned embodiment, the upper insulating gasket 20 is provided such that the outer peripheral surface thereof (more specifically, the outer peripheral surface on a side close to the peripheral edge portion in the longitudinal direction of the cover plate 10*b* out of the outer peripheral surface of the upper insulating gasket 20 in the longitudinal direction of the cover plate 10*b*, and the outer peripheral surface on a side close to the peripheral edge portion in the longitudinal direction of the cover plate 10*b* out of the outer peripheral surface of the flanged portion 201 in the longitudinal direction of the cover plate 10*b*) is located inward of a straight line connecting the upper end of the outer peripheral surface (more specifically, the outer peripheral surface on a side close to the peripheral edge portion in the longitudinal direction of the cover plate 10*b* out of the outer peripheral surface of the shielding member 4 in the longitudinal direction of the cover plate 10*b*) of the shielding member 4, and the peripheral edge portion (more specifically, the peripheral edge portion in the longitudinal direction of the cover plate 10*b*) of the outer surface of the cover plate 10*b*. In this case, the shielding member 4 can block not only the spatter S, but also laser light reflected from the molten portion. The upper insulating gasket 20 can be thereby prevented from being deteriorated due to the reflected laser light. However, the present invention is not limited thereto.

Also, in the aforementioned embodiment, the external terminal 31 obtained by integrally forming the connection terminal 310, the collar portion 311, and the rivet portion 312 is employed. However, the present invention is not limited thereto. For example, an external terminal composed of a connection strip formed in a planar shape, a bolt (a bolt terminal) as the connection terminal inserted through the connection strip, and a rivet as the connection member inserted through the connection strip may be employed.

Also, in the aforementioned embodiment, the upper insulating gasket 20 is arranged on the outer surface of the cover plate 10b after the shielding member 4 is externally fitted to the upper installation portion 200 of the upper insulating gasket 20, so that the shielding member 4 is arranged on the cover plate 10b. However, the present invention is not limited thereto. For example, the upper installation portion (the lower end portion) 200 may be surrounded by the shielding member 4 by arranging the upper insulating gasket 20 on the cover plate 10 after arranging the shielding member 4 on the cover plate 10b. The upper installation portion (the lower end portion) 200 may be also surrounded by the shielding member 4 by arranging the shielding member 4 on the cover plate 10b after arranging the upper insulating gasket 20 on the cover plate 10. In short, the shielding member 4 may surround the upper installation portion 200 of the upper insulating gasket 20 before the sealing step is performed (before the cover plate 10b is laser-welded to the battery case 10a).

Also, in the aforementioned embodiment, the peripheral edge portion of the outer surface of the cover plate 10b and the peripheral edge portion of the opening portion of the battery case 10a are welded together. However, the present invention is not limited thereto. For example, the peripheral edge portion of the cover plate 10b may be set to substantially the same shape as the peripheral edge portion of the opening portion of the battery case 10a, and a side surface of the cover plate 10b and a side surface of the battery case 10a may be laser-welded together with the cover plate 10b being arranged in the opening portion of the battery case 10a.

Also, in the aforementioned embodiment, the insulating gasket arranging step is performed at the same time as the shielding member arranging step. However, the present invention is not limited thereto. The insulating gasket arranging step may be performed before the shielding member arranging step. Alternatively, the insulating gasket arranging step may be performed after the shielding member arranging step.

REFERENCE SIGNS LIST

1: Cell, 4: Shielding member, 10: Cell case, 10a: Battery case, 10b: Cover plate, 20: Upper insulating gasket (insulating gasket), 21: Lower insulating gasket (insulating gasket), 30: Current collecting member, 31: External terminal, 110: Through hole, 200: Upper installation portion, 201: Flanged portion, 202: Concave portion (counterbore), 203: Second insertion hole, 210: Lower installation portion, 211: Small diameter portion, 212: Third insertion hole, 300: Connecting portion, 301: Electrode connecting portion, 302: First insertion hole, 310: Connection terminal, 311: Collar portion, 312: Rivet portion (connection member), A: Laser welding machine, D: Distance, L: Laser light, P: Peripheral edge portion, S: Spatter

The invention claimed is:
1. A cell, comprising:
an electrode assembly;
a battery case that includes an opening portion at one end so as to accommodate the electrode assembly inside thereof, the opening portion including a peripheral edge portion that includes an outer peripheral edge;
a cover plate that closes the opening portion of the battery case, a peripheral edge portion of an outer surface of the cover plate and the peripheral edge portion of the opening portion of the battery case along a portion of the peripheral edge portion inside the outer peripheral edge in a thickness direction of the peripheral edge portion of the opening portion being welded together to form a weld line;
a connection terminal that is arranged on the outer surface of the cover plate and electrically connected with a connection object;
a connection member that is inserted through the cover plate to electrically connect the connection terminal and the electrode assembly;
an insulating gasket that is interposed between the cover plate and the connection terminal; and
a shielding member that includes at least a portion that is arranged between the weld line and a portion of the insulating gasket adjacent to the weld line to be located in a vicinity of the weld line,
wherein the shielding member is arranged on an upper side of the cover plate,
wherein a distance from the outer surface of the cover plate to an upper end of an outer peripheral surface of the insulating gasket is greater than a distance from the outer surface of the cover plate to an upper end of an outer peripheral surface of the shielding member,
wherein the shielding member is formed in an annular shape, and externally fitted to the insulating gasket, and
wherein an inner periphery of the shielding member and an outer periphery of at least a portion of the insulating gasket to which the shielding member is externally fitted are formed in a non-circular shape having a same or a substantially same size.

2. The cell according to claim 1, wherein the insulating gasket includes:
an installation portion arranged on the outer surface of the cover plate; and
a flanged portion provided in continuity with an upper end of the installation portion,
the flanged portion being formed such that an outer peripheral surface thereof projects outward of an outer peripheral surface of the installation portion, and
the shielding member being externally fitted to the installation portion.

3. The cell according to claim 1, wherein the outer peripheral surface of the insulating gasket is located inward of a straight line connecting the upper end of the outer peripheral surface of the shielding member and the peripheral edge portion of the outer surface of the cover plate.

4. The cell according to claim 1, wherein the connection terminal and the connection member are integrally formed to constitute an external terminal,
wherein the insulating gasket includes a concave portion into which a predetermined position of the external terminal is fitted, and
wherein the predetermined position of the external terminal and the concave portion of the insulating gasket are formed in a non-circular shape having a same or a substantially same size.

5. The cell according to claim 1, wherein the shielding member comprises a metal material.

6. The cell according to claim 1, wherein the shielding member is formed integrally with the cover plate.

7. A method for manufacturing a cell, the method comprising:
provide an electrode assembly, a battery case, a cover plate, a connection terminal, a connection member, an insulating gasket, and a shielding member;
assembling the cell by arranging the insulating gasket on one surface of the cover plate, inserting the connection member through the cover plate and the insulating gasket, and thereafter electrically connecting the electrode assembly and the connection terminal via the connection member;
sealing the cell by accommodating the electrode assembly within the battery case from an opening portion of the battery case after the assembling, in which the opening portion includes a peripheral edge portion that includes an outer peripheral edge, closing the opening portion of the battery case by the cover plate such that the one surface of the cover plate becomes an outer surface, and thereafter sealing a peripheral edge portion of the outer surface of the cover plate and the peripheral edge portion of the opening portion of the battery case along a portion of the peripheral edge portion inside the outer peripheral edge in a thickness direction of the peripheral edge portion of the opening portion by laser welding; and
before the sealing, arranging at least a portion of the shielding member on an upper side of the cover plate and between a position to be welded as a portion where the peripheral edge portion of the outer surface of the cover plate and the peripheral edge portion of the opening portion of the battery case are welded together, and a portion of the insulating gasket adjacent to the position to be welded so as to locate the at least a portion of the shielding member in a vicinity of the position to be welded.

8. The cell according to claim 1, wherein the shielding member is arranged between the weld line and a portion of the insulating gasket adjacent to the weld line.

9. The cell according to claim 1, wherein the connection terminal and the connection member are integrally formed to constitute an external terminal,
wherein the external terminal includes a collar portion provided in continuity with one end of the connection member,
wherein the insulating gasket includes a concave portion into which the collar portion of the external terminal is fitted, and
wherein the collar portion of the external terminal and the concave portion of the insulating gasket are formed in a non-circular shape having a same or a substantially same size.

10. A method for manufacturing a cell, the method comprising:
providing an electrode assembly, a battery case, a cover plate, a connection terminal, a connection member, and an insulating gasket, the cover plate including a shielding member that includes at least a portion arranged on an upper side of the cover plate and between a weld line obtained by welding a peripheral edge portion of an outer surface of the cover plate and a peripheral edge portion of an opening portion of the battery case, in which the peripheral edge portion of the opening portion includes an outer peripheral edge, and a portion of the insulating gasket adjacent to the weld line, so as to be located in a vicinity of the weld line;
assembling the cell by arranging the insulating gasket on one surface of the cover plate, inserting the connection member through the cover plate and the insulating gasket, and thereafter electrically connecting the electrode assembly and the connection terminal via the connection member; and
sealing the cell by accommodating the electrode assembly within the battery case from the opening portion of the battery case after the assembling, closing the opening portion of the battery case by the cover plate such that the one surface of the cover plate becomes an outer surface, and thereafter sealing the peripheral edge portion of the outer surface of the cover plate and the peripheral edge portion of the opening portion of the battery case along a portion of the peripheral edge portion inside the outer peripheral edge in a thickness direction of the peripheral edge portion of the opening portion by laser welding.

11. The cell according to claim 1, wherein the weld line extends, in the thickness direction of the peripheral edge portion of the opening portion, from a bottom surface of the cover plate to a top surface of the cover plate.

12. The method according to claim 7, wherein the weld line extends, in the thickness direction of the peripheral edge portion of the opening portion, from a bottommost surface of the cover plate to a top surface of the cover plate.

13. The method according to claim 7, wherein the laser welding comprises directing a laser light in a direction orthogonal to an upper surface of the cover plate so as to be irradiated to a welding position of the cover plate and the battery case.

14. The method according to claim 10, wherein the laser welding comprises directing a laser light in a direction orthogonal to an upper surface of the cover plate so as to be irradiated to a welding position of the cover plate and the battery case.

15. The method according to claim 10, further comprising:
before the sealing, arranging a portion of the shielding member between a position to be welded as a portion where the peripheral edge portion of the outer surface of the cover plate and the peripheral edge portion of the opening portion of the battery case are welded together, and a portion of the insulating gasket adjacent to the position to be welded.

16. The method according to claim 15, wherein the portion of the shielding member is located in a vicinity of the position to be welded.

17. The cell according to claim 1, wherein the inner periphery of the shielding member is apart from the insulating gasket.

* * * * *